United States Patent [19]

D'Luna

[11] Patent Number: 5,077,810
[45] Date of Patent: Dec. 31, 1991

[54] DISTRIBUTED DIGITAL SIGNAL PROCESSING SYSTEM USING STANDARD RESOLUTION PROCESSORS FOR A HIGH RESOLUTION SENSOR

[75] Inventor: Lionel J. D'Luna, Rochester, N.Y.

[73] Assignee: Eastman Kodak Company, Rochester, N.Y.

[21] Appl. No.: 554,327

[22] Filed: Jul. 19, 1990

[51] Int. Cl.$^5$ .............................................. G06K 9/00
[52] U.S. Cl. ....................................... 382/41; 358/443
[58] Field of Search ............................ 382/41, 49, 42; 358/406, 443; 370/112

[56] References Cited

U.S. PATENT DOCUMENTS

| | | | |
|---|---|---|---|
| 4,288,820 | 9/1981 | Minamebayashi et al. | 358/406 |
| 4,314,281 | 2/1982 | Wiggins et al. | 358/406 |
| 4,363,104 | 12/1982 | Nussmeier | 382/41 |
| 4,384,336 | 5/1983 | Frankle et al. | 382/49 |
| 4,484,349 | 11/1984 | McCubbrey | 382/49 |
| 4,692,812 | 9/1987 | Hirahara et al. | 358/443 |
| 4,709,394 | 11/1987 | Bessler et al. | 382/41 |
| 4,790,026 | 12/1988 | Gennery et al. | 382/49 |
| 4,791,677 | 12/1988 | Mori et al. | 382/41 |
| 4,805,227 | 2/1989 | Wehner | 382/41 |

OTHER PUBLICATIONS

Parulski, K. A. et al., "Digital Color CCD Imaging System Using Custom VLSI Circuits," *IEEE Transactions on Consumer Electronics,* vol. 35, No. 3, Aug. 1989, pp. 382-388.

Mattausch, H. et al., "A Memory Based High-Speed Digital Delay Line with a Large Adjustable Length," *IEEE Journal of Solid State Circuits,* vol. SC-23, No. 1, pp. 105-110, Feb. 1988.

*Primary Examiner*—David K. Moore
*Assistant Examiner*—Yon Jung
*Attorney, Agent, or Firm*—David M. Woods

[57] ABSTRACT

A digital processing architecture for a high resolution image sensor uses a plurality of like digital processors for time-divided processing of the output of the sensor. Each processor is operational according to start and stop signals from a programmable sequencer. In a preferred embodiment, two sets of processors handle a line resolution of 1024 pixels, one set doing the first half of each line and the other set doing the second half. This is of particular utility where vertical processing is required, and the full line delays needed are divided into partial resettable delays resident in each of the processors.

5 Claims, 4 Drawing Sheets

DISTRIBUTED DIGITAL SIGNAL PROCESSING SYSTEM USING STANDARD RESOLUTION PROCESSORS FOR A HIGH RESOLUTION SENSOR

BACKGROUND OF THE INVENTION

1. Field of the Invention

This invention pertains to a signal processing architecture for an imaging system and, more particularly, to a digital processing circuit utilizing one or more line delays to process the image signals generated by a high resolution image sensor.

2. Description Relative to the Prior Art

In order to obtain quality color video images from a one-chip color charge-coupled device (CCD) sensor, a large amount of signal processing is required. FIG. 1 shows a known one-chip color CCD imaging system using custom digital video processing circuits. This system is described in detail in "A Digital Color CCD Imaging System Using Custom VLSI Circuits," by K. A. Parulski, L. J. D'Luna, and R. H. Hibbard, *IEEE Trans. on Consumer Electronics*, Vol. 35, No. 3, August 1989, pp. 382–388. This paper shows how the digital video processing is pipelined and operated at the same pixel rate as the image sensor, so that a framestore is not required. To minimize chip area, the signal processing has been carefully designed so that no multipliers are required.

The color imaging system shown in FIG. 1 includes a CCD sensor 10 and a color filter array 12. The color filter array 12 contains a pattern of red, green, and blue filters that provide a single red, green, or blue value for each photosite of the CCD sensor 10. The image sensor 10 is an interline transfer CCD with 570 horizontal by 484 vertical active pixels (e.g., the Model KAI-0280 sensor manufactured by the Eastman Kodak Co.) that is packaged in a leadless chip carrier which is mounted on a thick film hybrid substrate 14. The hybrid 14 includes the necessary clock drivers and bias circuits 16 and an output amplifier 18. The sensor output is processed by a clamp/sample-and-hold circuit 20 that implements a known correlated double sampling function. The processed sensor output signal is then digitized with a conventional flash A/D converter 22 and input to an interpolation processor 24.

As described in greater detail in the afore-mentioned paper, the interpolation processor 24 clamps the input video to the average sensor optical black reference value, conceals defects by substituting therefor the values of adjacent pixels, interpolates missing luminance pixels, converts to log space to perform gain control and white balance, and then interpolates chrominance values in log space. The latter interpolation is first completed in the vertical direction using on-chip line delays, and then in the horizontal direction using shift and add circuits. The log RGB outputs of the interpolation processor 24 are connected to the inputs of a post processor 26, which performs black level correction for lens flare, a 3 x 3 color matrix correction, gamma correction, and edge-enhancement. The edge enhancement improves the "crispness" of the image by extracting vertical and horizontal high frequency detail from the green channel and then adding the extracted detail back to the RGB signals. For this reason the post-processor 26 includes on-chip line delay in order to provide symmetric three-line vertical enhancement.

System timing is controlled by a programmable sequencer 28, which is described in "The EBS-1, an EPROM-based Sequencer ASIC," by M. D. 15.6.1–15.6.4, May 1988. A timing generation program allows the sequencer timing to be quickly developed or modified. The sequencer 28 incorporates various pixel and line counters that implement imager read-out functions according to instructions from the system controls, e.g., camera shutter button and the like. The interpolation processor 24 and the post-processor 26 chips include resettable line delays to support signal processing from sensors with up to 768 active photosites per line, making the chips suitable for NTSC, PAL, and CCIR 601 video standards. When applications requiring "higher than video" resolution arise, i.e., requiring a line resolution greater than 768 active photosites, then these "video" custom chips cannot be directly used. Moreover, "higher than video" custom chips devoted to high resolution processing have certain disadvantage since it is difficult to integrate the longer line delays necessary for high resolution processing on a chip of reasonable size.

It is known to provide higher resolution by using two linear sensors with a small overlap between them to scan a large line length (see, e.g., U.S. Pat. Nos. 4,314,281 and 4,692,812). The main concern of such disclosures is the matching of the line outputs at the crossover point, although the '281 patent provides certain initial signal processing in the two separate output channels, in particular a gain adjustment related to the operating characteristics of each array. In U.S. Pat. No. 4,484,349 a parallel pipeline image processor is described in which an image matrix is partitioned so that contiguous segments of the image can be processed simultaneously by two or more adjacent serial neighborhood processors. A processor as described in the '349 patent would not be suitable for the type of imaging system described in the Parulski et al article without the addition of full image storage, which would be very expensive for high resolution image processing. Consequently, the need exists to incorporate the processor chips 24 and 26 of FIG. 1 into a mega-pixel imaging system, particularly one that has the capability of providing vertical interpolation and processing vertically-oriented detail.

SUMMARY OF THE INVENTION

It is an objective of the invention to use the afore-mentioned custom processing chips with resettable line delays described in the aforementioned Parulski et al article with image sensor arrays having line resolution greater than the chips, particularly considering the line delays resident therein, were designed to handle.

The invention is based on the realization that the effect of a full (high resolution) line delay needed for certain vertical processing effects can be obtained by allocating separate processors each with partial line delays to separate segments of the image and then interrupting the process, and the delays therewith, at the segment boundaries. Accordingly, each line of the image sensor is divided into at least a first line section and a second line section and separate processors are allocated to each section. A first processor includes a first partial line delay corresponding to the length of the first line section, while a second processor includes a second partial line delay corresponding to the second line section. The two processors are then sequenced so that the first processor is operational during the scanning of the first line section and the second processor is operational during the scanning of the second line section. By such sequencing, the two partial line delays form a contiguous delay corresponding to a line of the image sensor, thereby enabling standard resolution processors to be used in a high resolution application.

BRIEF DESCRIPTION OF THE DRAWINGS

The invention will be described in relation to the drawings, in which.

DETAILED DESCRIPTION OF THE INVENTION

Figure 1:
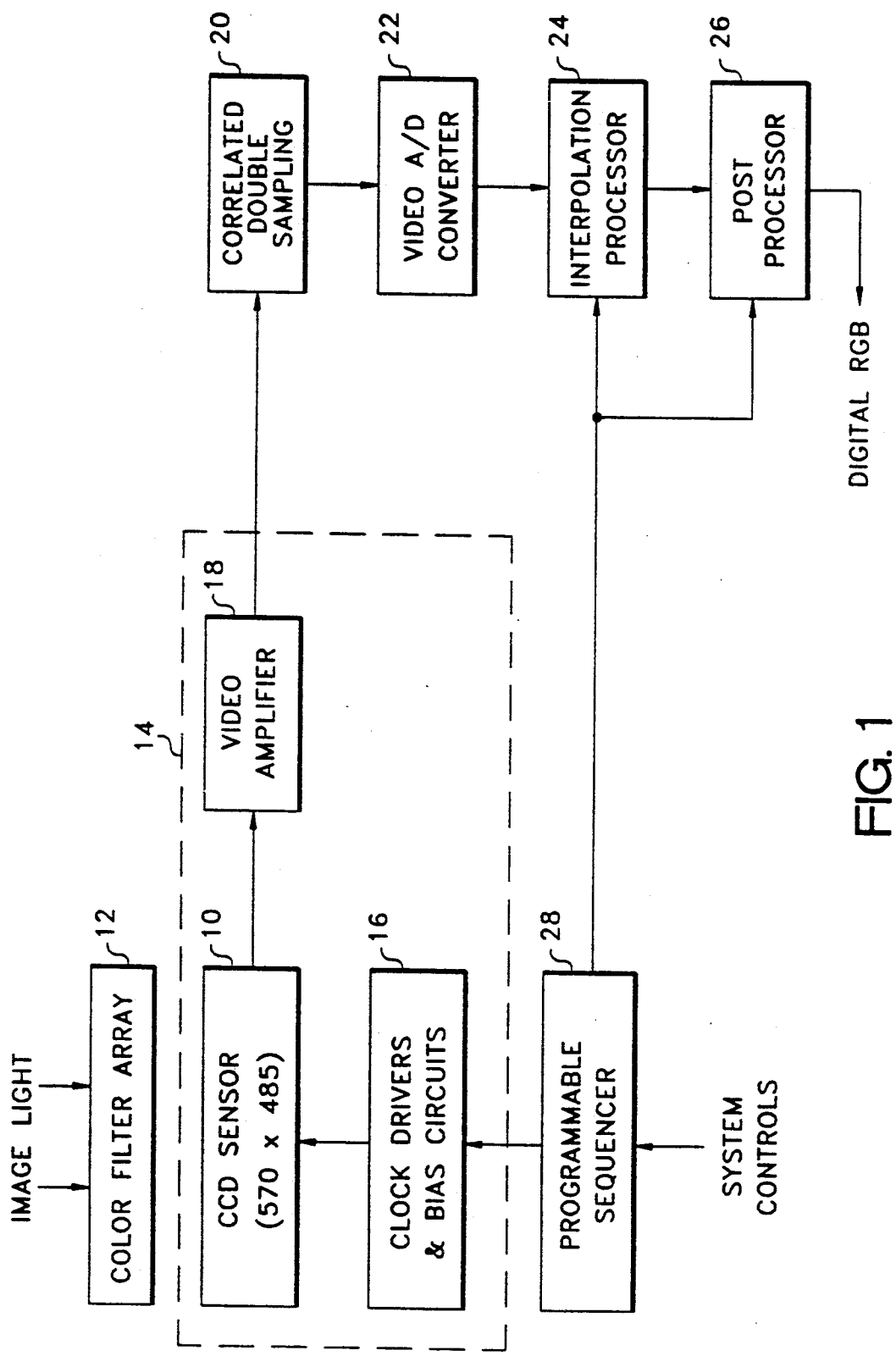
FIG. 1 is a diagram of a known digital signal processing architecture for a standard resolution sensor.

Since digital processing systems are well known, the present description will be directed in particular to elements forming part of, or cooperating more directly with, the present invention. Elements not specifically shown or described herein may be selected from those known in the art. In particular, details of the processors 24 and 26, and the sequencer 28, of FIG. 1 are provided in the aforementioned IEEE articles by Parulski et al and Brown et al which are incorporated herein by reference for their disclosure of background materials. (The interpolation processor 24 and the post processor 26 are referred to in the Parulski et al article as a "CFA Signal Processor" and "RGB Signal Post-Processor", respectively).

Figure 2:
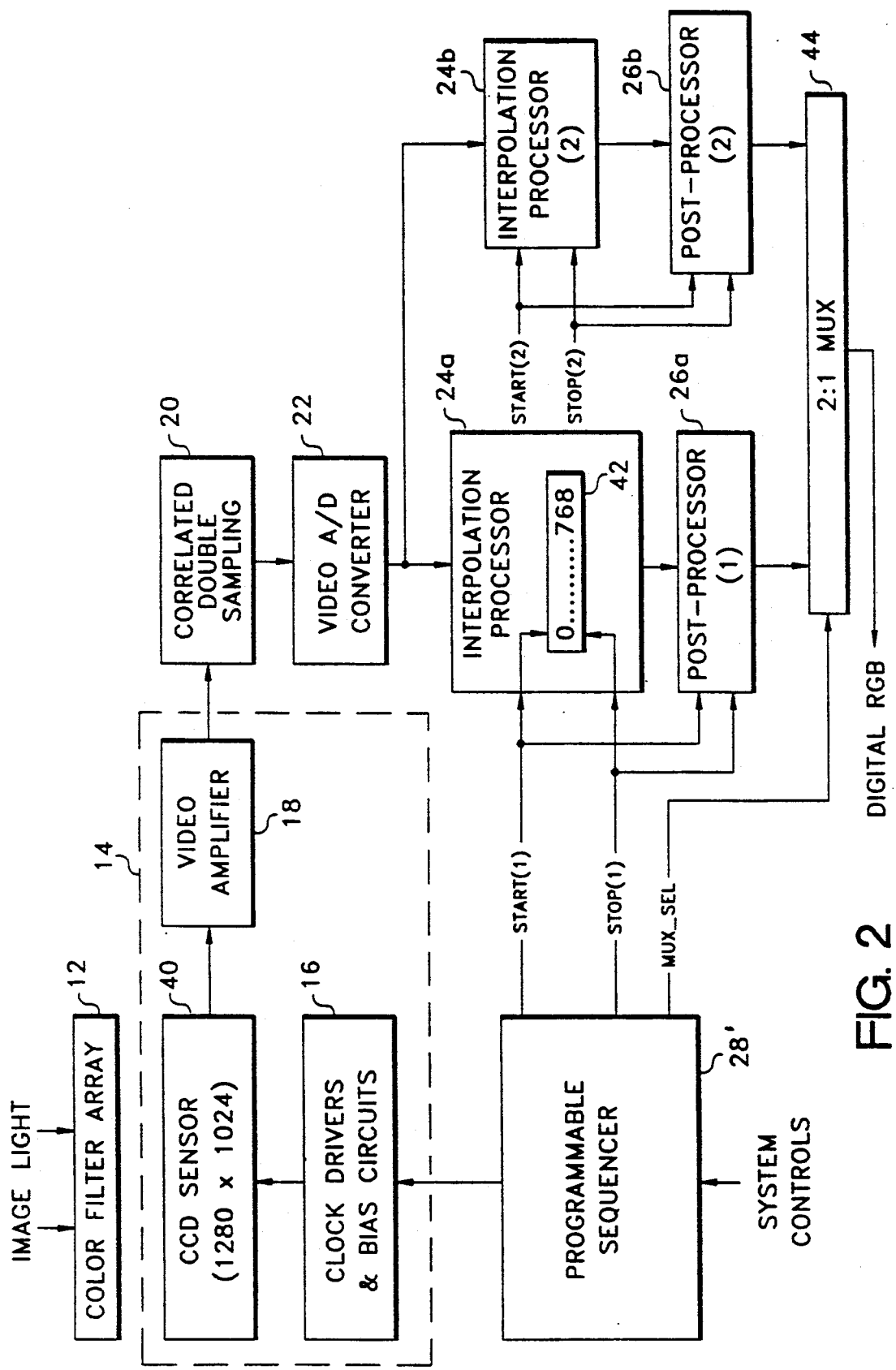
FIG. 2 is a diagram of a distributed digital signal processing architecture according to the invention for a high resolution sensor.

In accordance with the invention, the digital signal processing of the image signals generated by a high resolution sensor 40 can be accomplished with the same interpolation and post-processor chips 24 and 26 as described in FIG. 1 by using them in a distributed processing architecture as shown in FIG. 2. Since this distributed architecture uses many of the same processing elements as used in the architecture of FIG. 1, the same reference characters are used to describe elements that are basically the same (allowing for insubstantial differences, e.g., the color filter array 12 is basically the same although sized to accommodate a higher resolution sensor pattern in FIG. 2). The interpolation processor 24 and the post-processor 26 described in FIG. 1 require externally supplied start and stop signals for the on-chip line-delays. Such start and stop signals support a range of sensors 10, each having a different number of pixels per line. The line delays, however, process a maximum of 768 pixels/line. Therefore, for an image sensor 40 having less than 1536 pixels/line (i.e., 2×768 pixels), two processor chipsets are required, that is, interpolation processors 24a and 24b and post-processors 26a and 26b. Thus, the FIG. 2 diagram is the preferred architecture for the illustrated sensor 40, having 1280 horizontal pixels by 1024 vertical pixels, such as the model KAF 1300C CCD image sensor manufactured by the Eastman Kodak Co. Clearly, larger image sensor arrays would merely require additional processors. For example, a 4 mega-pixel sensor having 2048 pixels in a line (such as the model KAF-4200 manufactured by the Eastman Kodak Co.) would require three processor sets.

Figure 3:
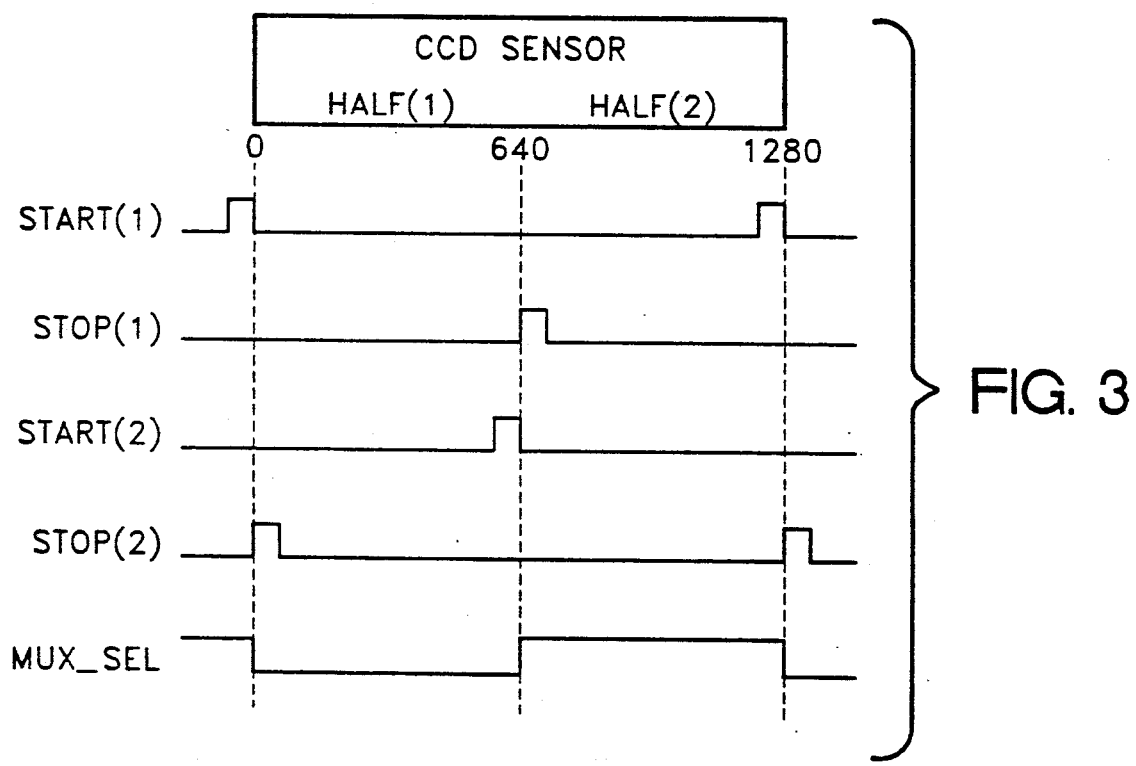
FIG. 3 is a waveform diagram of several signals involved in the operation of the signal processing architecture of FIG. 2.

Referring now to FIG. 2, the interpolation processor 24a and the post-processor 26a process half the image from the image sensor 40 and the interpolation processor 24b and the post-processor 26b process the other half of the image. For this purpose, the programmable sequencer 28 is programmed (and renumbered in FIG. 2 as 28') to produce the waveforms of FIG. 3. More specifically, the processors 24a and 26a are started by the signal start(1) at the beginning of each line time (pixel 0) and stopped by the signal stop(1) at about half or each line time (e.g., pixel 640). The processors 24b and 26b are started by the signal start(2) at about half of each line time (e.g., pixel 641) and stopped by the signal stop(2) at the end of each line time (pixel 1280). As shown by a delay element 42 in the interpolation processors 24a and 24b, the waveforms of FIG. 3 also serve to start(2)) at pixel 0 and then to stop the delay element (signal stop(1) or stop(2)) at a selected pixel position up to pixel 768. The half-line output signals from the post-processors 26a and 26b are then time-division multiplexed into a single RGB output stream by a 2:1 multiplexer 44, which is toggled by the signal mux-sel from the sequencer 28'.

The two sets of processors 24a and 26a, and 24b and 26b, are therefore idle about half of each line time, intermittently starting and stopping pursuant to instructions from the sequencer 28' as a full raster is scanned line-by-line. As long as each processor is capable of processing at the same rate as the sensor read-out, the distributed architecture of FIG. 2 can handle the image data in real time. Importantly, the line delays necessary to associate two or more pixels vertically can be performed with the partial line delays inherent in each processor.

Figure 4A:
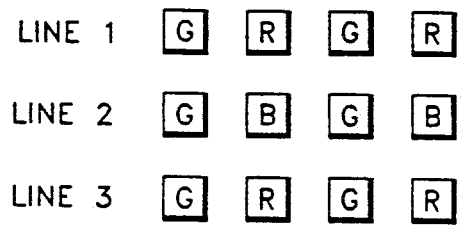
FIG. 4(A) is an illustration of the type of color filter array requiring vertical interpolation.
Figure 4B:
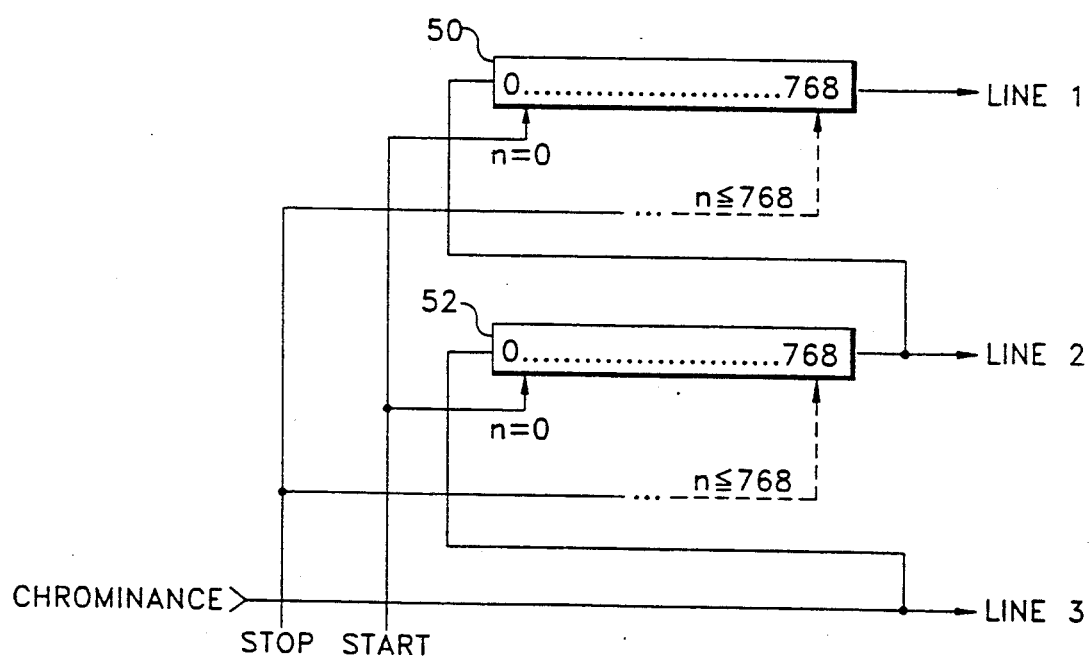
FIG. 4(B) is an example of a line delay arrangement for use in such vertical interpolation.

FIG. 4(A), which shows a small section of a typical color filter array 12, is helpful in understanding the need for vertical interpolation. System chrominance values, that is, color values derived from both R and B pixels, are not present on every line. Therefore, at least one full line delay is provided in order to interpolate, or align, an R and B chrominance value with every pixel position. For example, in FIG. 4(B), two line delays 50 and 52 are provided (in, e.g., the interpolation processors 24a and 24b) to align three output values in order to perform vertical interpolation across three lines. Each delay is resettable so as to start (start(0)) at the first pixel position (0) and to stop (stop (n< =768) at an arbitrary pixel position less than or equal to pixel position 768. In this way each line delay can be exactly configured to handle the portion of the total line allocated to each processor set 24a and 26a, and 24b and 26b. Although not shown separately, a similar arrangement of resettable line delays can be provided in the post-processors 26a and 26b to provide the necessary pixel values for vertical enhancement. Resettable delay lines are conventionally known; see, for example, Mattausch, H. et al, "A Memory-Based High-Speed Digital Delay Line with a Large Adjustable Length", *IEEE Journal of Solid State Circuits*, vol. SC-23, No. 1, pgs. 105–110, Feb. 1988.

While the preceding description illustrates the arbitrary starting and stopping of each processor set 24a and 26a, and 24b and 26b, it is possible in a further embodiment to freely operate the first processor set 24a and 26a and to let the multiplexer 44 effect the sequencing between processor sets. In other words, it is unnecessary to arbitrarily stop the processors 24a and 26a. They are simply started at the beginning of the line and the multiplexer 44 sequences the output signal by switching to the other processors 24b and 26b when they are started. The fact that the processors 24a and 26a continue to operate is of no consequence. In certain situations, this embodiment may be preferred because one reset signal (the stop signal for processors 24a and 26a) can be eliminated. Furthermore, in cases where less than the full line length of the second processor set 24b and 26b is required, it is feasible to start the line delays in the second set at an appropriate pixel location and let them continue to the end of the line (rather than start the line delays at n=0 and stop them at the appropriate pixel location).

The invention has been described in detail with particular reference to a presently preferred embodiment, but it will be understood that variations and modifications can be effected within the spirit and scope of the invention.

What is claimed is:

1. A signal processing system for generating vertically-processed image signals from the scanned output of a two-dimensional image sensor, each line of said image sensor being divided into at least a first line section and a second line section, said signal processing system comprising:

first processing means for processing image signals derived from said first line section, said first processing means including a plurality of first partial line delays corresponding to a plurality of said first line sections;

second processing means for processing image signals derived from said second line section, said second processing means including a plurality of second partial line delays corresponding to a plurality of said second line sections; and means for sequencing the operation of said first and second processing means so that said first processing means is operational during the scanning of the first line sections and said second processing means is operational during the scanning of the second line sections, said two pluralities of partial line delays thereby forming a contiguous delay useful in the vertical processing of image signals corresponding to plural lines of the image sensor.

2. A signal processing system as claimed in claim 1 wherein said partial line delays are resettable line delays, and said sequencing means provides reset signals to said line delays for starting and stopping each delay in correspondence to the length of each line section.

3. A signal processing system as claimed in claim 1 wherein the sensor is a color sensor that does not provide full chroma information in each line and said partial line delays in said first and second processing means are used to vertically interpolate chroma information.

4. A signal processing system as claimed in claim 1 wherein said first and second processing means perform an enhancement operation and said partial line delays are used to generate vertically-enhanced detail.

5. A signal processing system as claimed in claim 1 further including a multiplexer to provide a time-divided sequence of the outputs of said first and second processing means.

* * * * *